(12) United States Patent
Li et al.

(10) Patent No.: US 11,391,196 B2
(45) Date of Patent: Jul. 19, 2022

(54) HEAT SHIELD, EXHAUST SYSTEM AND AUTOMOBILE

(71) Applicant: Faurecia Emission Control Technologies (Shanghai) Co., Ltd., Shanghai (CN)

(72) Inventors: Yongsheng Li, Shanghai (CN); Haitao Shi, Shanghai (CN); Fei Cheng, Shanghai (CN)

(73) Assignee: Faurecia Emission Control Technologies (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 17/144,904

(22) Filed: Jan. 8, 2021

(65) Prior Publication Data

US 2021/0215084 A1 Jul. 15, 2021

(30) Foreign Application Priority Data

Jan. 9, 2020 (CN) .......................... 202020045136.5

(51) Int. Cl.
*F01N 13/14* (2010.01)
*B60R 13/08* (2006.01)
*F01N 13/18* (2010.01)

(52) U.S. Cl.
CPC .......... *F01N 13/14* (2013.01); *B60R 13/0876* (2013.01); *F01N 13/143* (2013.01); *F01N 13/1844* (2013.01); *F01N 13/1872* (2013.01); *F01N 2260/20* (2013.01); *F01N 2310/00* (2013.01); *F01N 2450/22* (2013.01); *F01N 2510/02* (2013.01)

(58) Field of Classification Search
CPC .... F01N 13/14; F01N 13/143; F01N 13/1844; F01N 13/1872; F01N 2260/20; F01N 2310/00; F01N 2450/22; F01N 2510/02; B60R 13/0876
See application file for complete search history.

(56) References Cited

U.S. PATENT DOCUMENTS

| | | | | |
|---|---|---|---|---|
| 5,250,269 A | * | 10/1993 | Langer | ............... C04B 35/62245 422/179 |
| 6,884,398 B1 | * | 4/2005 | Biel, Jr. | ................... F01N 13/14 422/179 |
| 9,452,719 B2 | * | 9/2016 | Chauhan | ................... D04H 1/46 |
| 2003/0086832 A1 | * | 5/2003 | Turek | ....................... F01N 13/14 422/179 |

(Continued)

FOREIGN PATENT DOCUMENTS

| | | | | |
|---|---|---|---|---|
| GB | 1367181 A | * | 9/1974 | ............... F16L 59/18 |
| WO | WO-2019234184 A1 | * | 12/2019 | ........... F01N 3/2853 |

*Primary Examiner* — Audrey B. Walter
(74) *Attorney, Agent, or Firm* — Quarles & Brady LLP

(57) ABSTRACT

A heat shield comprises a first thermal insulation section and a second thermal insulation section, wherein the second thermal insulation section is axially connected to the first thermal insulation section, and the thermal insulation performance of the second thermal insulation section is lower than that of the first thermal insulation section. The heat shield is advantageous in that it cannot only achieve a good integral thermal insulation effect, but also protect thermal-fatigue weak zones of an exhaust system shell, so as to prolong the operating life of the exhaust system and reduce the costs of maintenance and repair for an automobile, etc.

11 Claims, 3 Drawing Sheets

(56) References Cited

U.S. PATENT DOCUMENTS

| | | | |
|---|---|---|---|
| 2007/0065349 A1* | 3/2007 | Merry | F01N 13/14 |
| | | | 422/179 |
| 2007/0081928 A1* | 4/2007 | Linsler | F01N 13/1888 |
| | | | 422/179 |
| 2007/0119156 A1* | 5/2007 | Hill, Jr. | F01N 13/1894 |
| | | | 60/302 |
| 2019/0055876 A1* | 2/2019 | Willats | B01D 53/9418 |
| 2021/0215086 A1* | 7/2021 | Perret | F01N 13/14 |

* cited by examiner

HEAT SHIELD, EXHAUST SYSTEM AND AUTOMOBILE

CROSS-REFERENCE TO RELATED APPLICATIONS

This application claims priority to Chinese Application No. 202020045136.5 filed Jan. 9, 2020, the disclosure of which is incorporated herein by reference in its entirety and for all purposes.

TECHNICAL FIELD

The present disclosure relates to the field of exhaust gas treatment, and in particular to a heat shield, an exhaust system and an automobile.

BACKGROUND

During operation of an internal combustion engine, the generated high-temperature exhaust gas is subjected to harmless treatment in an exhaust system. A heat shield is generally mounted outside a shell of the exhaust system to reduce the heat transfer of the exhaust system to external components. Such a configuration can not only prevent the external components from being in a high-temperature environment to protect the external components, but also prevent the heat inside the exhaust system from dissipating too fast, thereby ensuring that the inside of the exhaust system is at a proper temperature to make full use of the heat in the exhaust gas, for example, the use of the energy of the exhaust gas for turbocharging. For example, it is also necessary to meet the temperature requirements of a catalytic reaction for the exhaust gas treatment. For example, in a selective catalytic reduction (SCR) reaction for nitrogen oxide treatment in some exhaust systems, the urea sprayed therefrom decomposes into ammonia gas (NH3) that reacts with NOx to produce water and nitrogen gas. However, when the temperature reaches 200° C. or above, NH3 starts to react with NOx, and the reaction is enhanced as the temperature rises, i.e., the minimum exhaust temperature required by the SCR is 200° C.

However, the inventors have found in practice that the thermal insulation function of the heat shield structure also causes certain negative effects in the exhaust system. A heat shield structure of the prior art can be referred to as shown in FIG. 1. A heat shield 100 comprises a thermal insulation material layer 101 and a heat shield housing 102. The thermal insulation material layer 101 covers an exhaust system shell 200. The inventors have found that this caused fatigue failure in some zones of the exhaust system shell 200. The reason is that when the zones receive alternating cold and heat loads, the material shrinks and expands accordingly and generates a large force, which is likely to cause thermo-mechanical fatigue failure in weak positions, thereby affecting the service performance thereof, i.e., these zones are thermal-fatigue weak zones of the exhaust system shell. Especially in a gasoline engine with higher temperature, this problem is more serious. For example, a welded joint 201 of two adjacent components connected by welding in the exhaust system shell 200 in FIG. 1 is a typical example of a thermal-fatigue weak zone.

Therefore, there is a need in the art for a heat shield, an exhaust system, and an automobile. The heat shield can not only achieve a good integral thermal insulation effect, but also protect thermal-fatigue weak zones of an exhaust system shell, so as to prolong the operating life of the exhaust system and reduce the costs of maintenance and repair for an automobile.

SUMMARY

One objective of the present disclosure is to provide a heat shield.

Another objective of the present disclosure is to provide an exhaust system.

A further objective of the present disclosure is to provide an automobile.

According to one aspect of the present disclosure, a heat shield for an exhaust system, covering an exhaust system shell, the heat shield comprising: a first thermal insulation section, and a second thermal insulation section, wherein the second thermal insulation section is axially connected to the first thermal insulation section, and the thermal insulation performance of the second thermal insulation section is lower than that of the first thermal insulation section.

In one or more embodiments of the heat shield, the first thermal insulation section comprises a thermal insulation material layer and a first housing, with an inner side of the thermal insulation material layer being configured to be in contact with the shell, and the first housing covering the thermal insulation material layer on an outer side of the thermal insulation material layer; the second thermal insulation section comprises a second housing and a second material layer, with the thermal insulation performance of the second material layer being lower than that of the thermal insulation material layer, and the second housing covering the second material layer on an outer side of the second material layer; and the second housing is axially connected to the first housing.

In one or more embodiments of the heat shield, the second material layer is an air layer, and the material of the thermal insulation material layer is a porous thermal insulation material.

In one or more embodiments of the heat shield, the temperatures of the second thermal insulation section and of the first thermal insulation section are reduced by 30-55 degrees Celsius.

In one or more embodiments of the heat shield, the second housing is radially and inwardly recessed an inward recessing depth relative to the first housing.

In one or more embodiments of the heat shield, the thickness of the second material layer is the same as that of the thermal insulation material layer, and the radial dimensions of the second housing is the same as that of the first housing.

An exhaust system according to one aspect of the present disclosure comprising an exhaust system shell, the exhaust system further comprising a heat shield as described in any one of the above, wherein the exhaust system shell comprises a thermal-fatigue weak zone and a non-weak zone, the first thermal insulation section of the heat shield covers the non-weak zone, and the second thermal insulation section of the heat shield covers the thermal-fatigue weak zone.

In one or more embodiments of the exhaust system, the thermal-fatigue weak zone comprises a welded joint of the exhaust system shell.

An automobile according to an aspect of the present disclosure, comprising an internal combustion engine and an exhaust system as described in any one of the above.

In one or more embodiments of the automobile, the internal combustion engine is a gasoline engine.

The progressive effects of the present disclosure include but are not limited to:

1. the second thermal insulation section is used to protect the thermal-fatigue weak zone in the exhaust system shell and weaken the thermal insulation effect of the thermal-fatigue weak zone, such that the temperature of the thermal-fatigue weak zone is reduced to prolong the fatigue life of the thermal-fatigue weak zone, so as to prolong the fatigue life of the whole exhaust system shell, reduce the maintenance cost, and also ensure the reliable operation of the exhaust system; and the first thermal insulation section with good thermal insulation performance is used to cover most of the other zones of the exhaust system, i.e., the thermal-fatigue non-weak zone, for thermal insulation so as to maintain the temperature of the exhaust system and prolong the fatigue life of the exhaust system shell;

2. the configuration of the second thermal insulation section can also make the temperature distribution in the thermal-fatigue weak zone more uniform and reduce the thermal stress;

3. due to the prolonged fatigue life of the exhaust system shell, the maintenance costs of the exhaust system and the automobile can be reduced, and the operation reliability of the exhaust system and the automobile can be improved.

BRIEF DESCRIPTION OF THE DRAWINGS

The above-mentioned and other features, properties and advantages of the present disclosure will become more apparent from the following description in conjunction with the accompanying drawings and the embodiments. It is to be noted that the accompanying drawings are merely examples, which are not drawn to scale, and should not be construed as limiting the scope of protection actually claimed by the present disclosure, in the accompanying drawings:

REFERENCE NUMERALS

100—Heat shield
101—Thermal insulation material layer
102—Heat shield housing
200—Exhaust system shell
201—Welded joint
1—Heat shield
11—First thermal insulation section
111—First housing
12—Second thermal insulation section
121—Second housing
122—Second material layer

DETAILED DESCRIPTION

Various implementations or embodiments of the technical solutions implementing the subject matter will be disclosed below. Specific examples of various elements and arrangements will be described below for the purpose of simplifying the disclosure. Of course, these are merely examples and are not intended to limit the scope of the present disclosure.

In addition, the expressions "first", "second", etc. are used to limit components and parts only for the purpose of facilitating distinction between corresponding components and parts, and unless otherwise stated, the above expressions have no special meaning and therefore cannot be interpreted as limiting the scope of protection of the present disclosure. The expressions "one embodiment", "an embodiment" and/or "some embodiments" are intended to mean a certain feature, structure, or characteristic associated with at least one embodiment of the present application. Hence, it should be emphasized and noted that "an embodiment" or "one embodiment" or "one or more embodiments" mentioned in two or more different positions in this specification does not necessarily refer to the same embodiment. Furthermore, some of the features, structures or characteristics of one or more embodiments of the present application can be combined as appropriate.

The exhaust system described in the following embodiment is exemplified by an exhaust system of a gasoline engine of an automobile.

Figure 3:
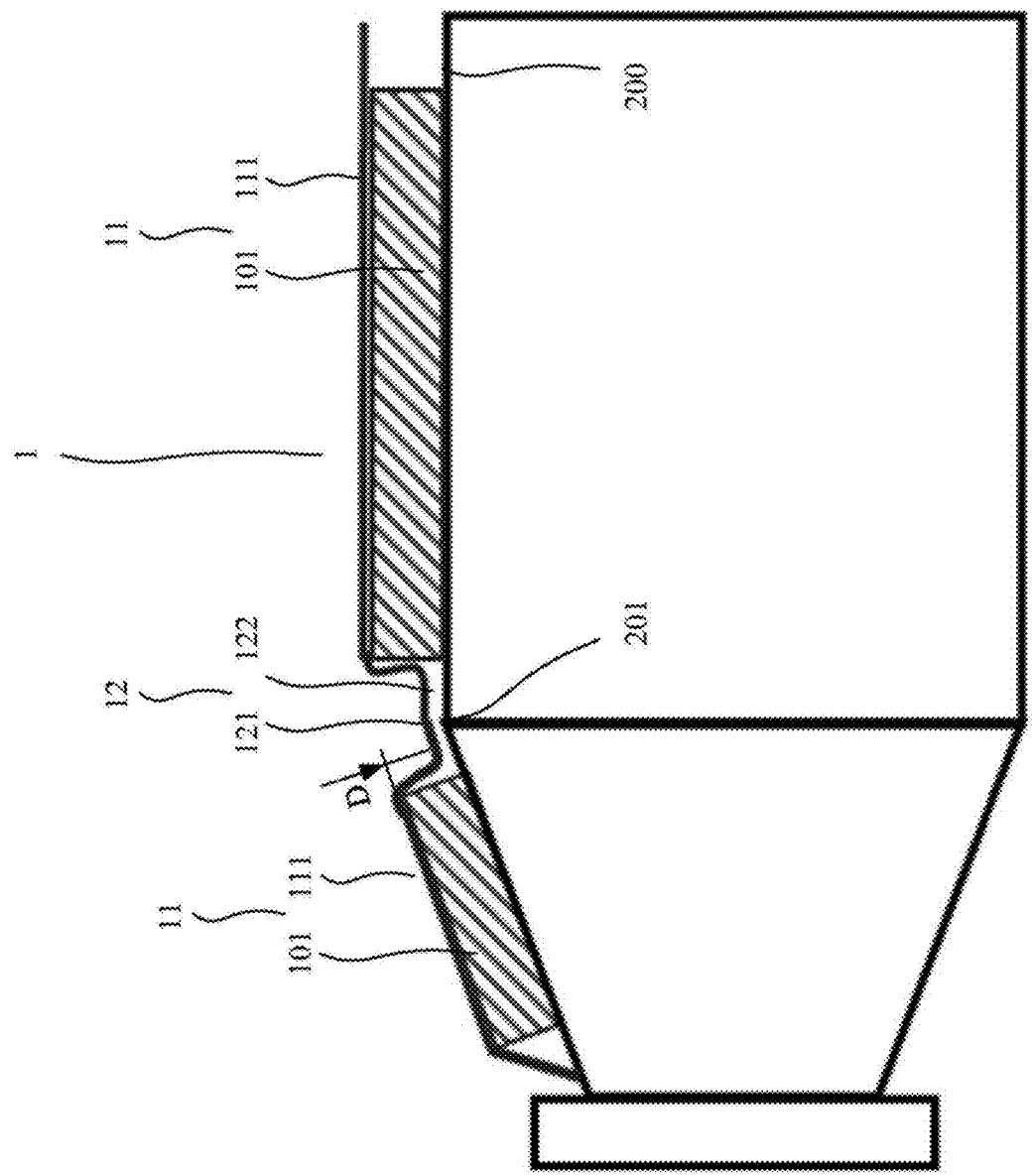
FIG. 3 is a schematic diagram of an assembled structure of a heat shield and an exhaust system shell according to an embodiment.
Figure 4:
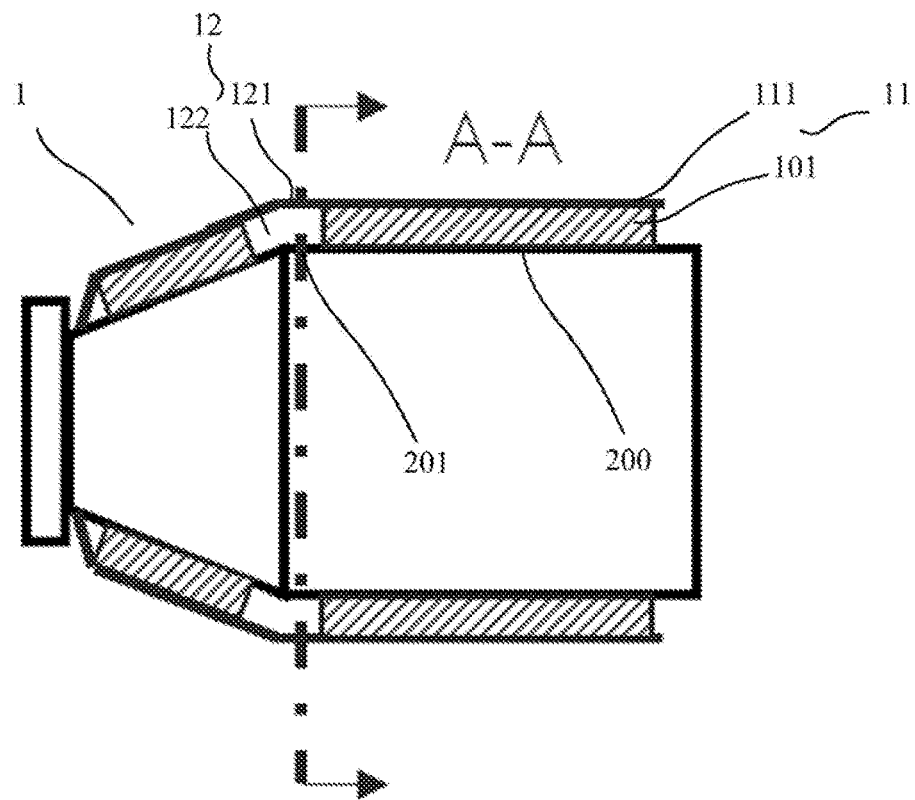
FIG. 4 is a schematic diagram of an assembled structure of a heat shield and an exhaust system shell according to another embodiment.

As shown in FIGS. 3 and 4, in an embodiment, a heat shield 1 covers an exhaust system shell 200 of an exhaust system. The heat shield 1 comprises a first thermal insulation section 11 and a second thermal insulation section 12 which are axially connected. The second thermal insulation section 12 is correspondingly arranged at the welded joint 201 of the exhaust system shell 200. It may be appreciated that a thermal-fatigue weak zone of the exhaust system shell 200 is not limited to the welded joint 201 depicted in the figures, may also be a connection made of different materials, for example, a connection of austenitic steel and ferritic steel, and may further be a sharp zone, etc.

The first thermal insulation section 11 and the second thermal insulation section 12 may have the specific structure in that the first thermal insulation section 11 comprises a first housing 111 and a thermal insulation material layer 101, and the second thermal insulation section 12 comprises a second housing 121 and a second material layer 122. The thermal insulation material of the thermal insulation material layer 101 may be a common porous thermal insulation material in the art, such as glass fiber, rock wool, and polyimide foam. The second material layer 122 may have the specific structure as shown in FIGS. 3 and 4. The structure of the second material layer 122 may be an air layer as shown in the figures, but is not limited thereto, and may also be other materials, provided that the thermal insulation performance of the second material layer 122 is lower than that of the thermal insulation material layer 101. With the configuration of an air layer, the material cost is low, and there is no need to perform the additional procedure of filling the second material layer 122, so as to minimize the manufacturing cost of the heat shield.

Further with reference to FIGS. 3 and 4, the specific structure of the second thermal insulation section 12 may be an embodiment shown with reference to FIG. 4, in which the second material layer 122 has the same thickness as the thermal insulation material layer 101, and the second housing 121 has the same radial dimension as the first housing 111, such that the second housing 121 and the first housing 111 of the heat shield 1 are easier to be integrally processed; and may also be one or more embodiments as shown in FIG. 3, in which the second housing 121 is radially and inwardly recessed an inward recessing depth D relative to the first housing 111 so as to form a groove structure between the two first thermal insulation sections 11, such that the thermal insulation performance of the second thermal insulation section 12 is further lower than that of the first thermal insulation section 11 by this arrangement.

Those skilled in the art would have appreciated that the specific structure of the first thermal insulation section 11 and the second thermal insulation section 12 is not limited by the above description, provided that the thermal insulation performance of the second thermal insulation section 12 is lower than that of the first thermal insulation section 11. Even in some embodiments, the second thermal insulation section 12 may be arranged to be blank, i.e., there is no second housing 121, and the second thermal insulation section 12 only has air.

Figure 1:
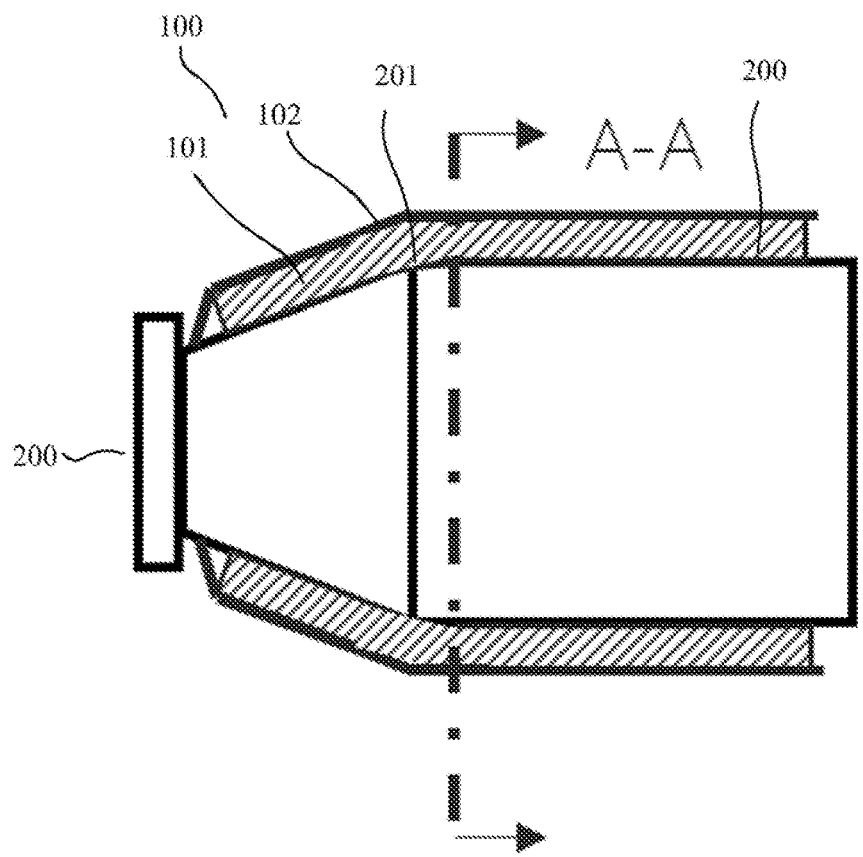
FIG. 1 is a schematic diagram of an assembled structure of a heat shield and an exhaust system shell in the prior art.

The heat shield 1 provided with the first thermal insulation section 11 and the second thermal insulation section 12 has beneficial effects in that the second thermal insulation section 12 can be used to protect the thermal-fatigue weak zone in the exhaust system shell 200 and weaken the thermal insulation effect of the thermal-fatigue weak zone, such that the temperature of the thermal-fatigue weak zone is reduced to prolong the fatigue life of the thermal-fatigue weak zone, so as to prolong the fatigue life of the whole exhaust system shell, reduce the maintenance cost, and also ensure the reliable operation of the exhaust system; and the first thermal insulation section 11 with good thermal insulation performance is used to cover most of the other zones of the exhaust system 200, i.e., the thermal-fatigue non-weak zone, for thermal insulation so as to maintain the temperature of the exhaust system. The specific position of the thermal-fatigue weak zone in the exhaust system shell 200 may be obtained through experiments or by means of computer simulation, as described above, in addition to the welded joint 201 shown in FIGS. 1, 3, and 4, it may also be a connection made of different materials, for example, a connection of austenitic steel and ferritic steel, and may also be a sharp zone, etc.

Figure 2:
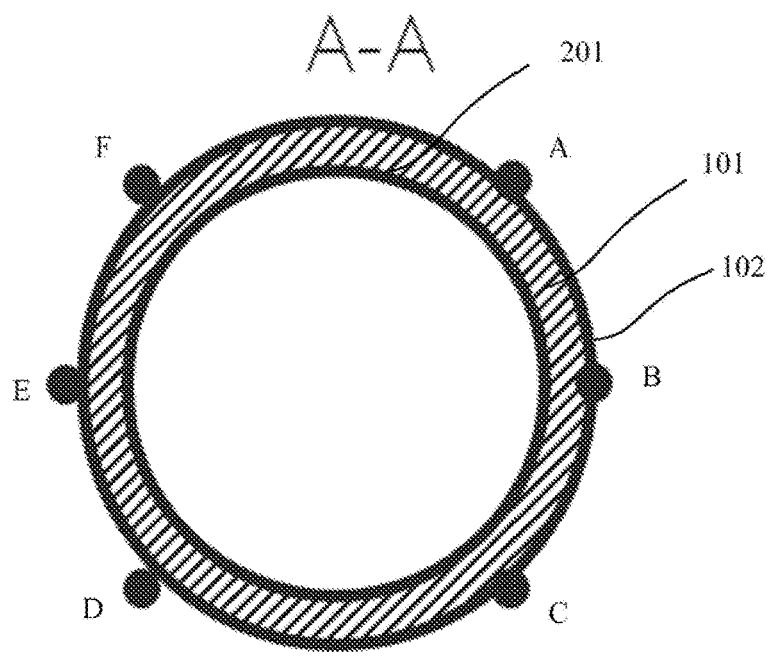
FIG. 2 is a cross-sectional diagram taken along A-A in FIG. 1.
Figure 5:
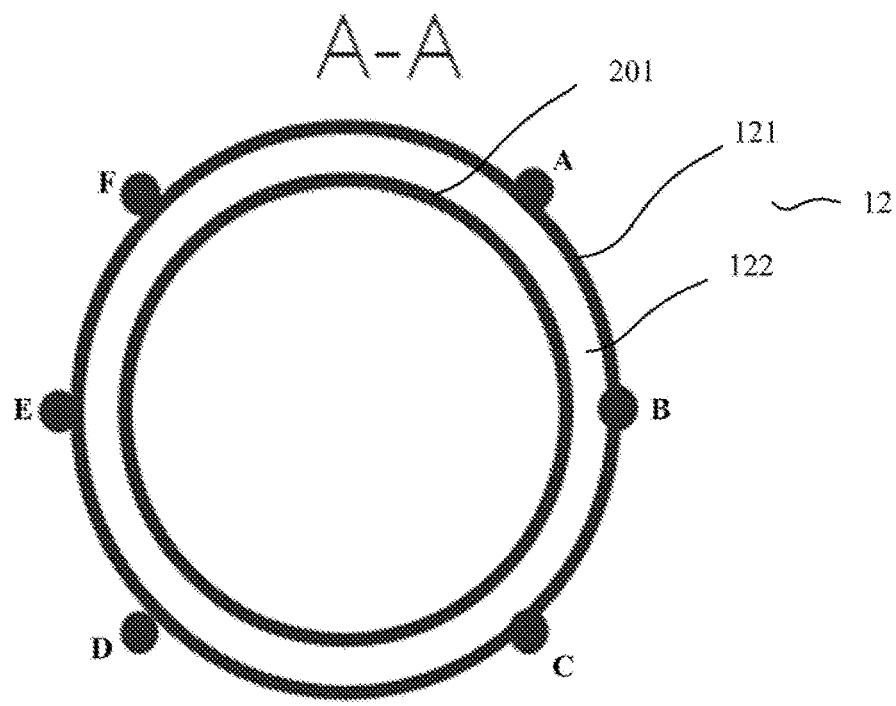
FIG. 5 is a cross-sectional diagram taken along A-A in FIG. 4.

Referring to FIGS. 1, 2, 4 and 5, in order to test the difference in the thermal insulation effect of the first thermal insulation section 11 and the second thermal insulation section 12, the temperature of the heat shield structure of the prior art, i.e., the first thermal insulation section 11 and the second thermal insulation section 12, at the cross section A-A, i.e., the welded joint 201, is measured, with measurement points being six measurement points A, B, C, D, E and F, which are uniformly distributed in a circumferential direction, as shown in FIGS. 2 and 5, and the measurement results being shown in Tables 1 and 2.

TABLE 1

Temperature of heat shield in the prior art corresponding to welded joint 201 at cross section A-A

| Position | Temperature (° C.) |
|---|---|
| A | 799 |
| B | 793 |
| C | 785 |
| D | 784 |
| E | 755 |
| F | 732 |

TABLE 2

Temperature of second thermal insulation section 12 of the embodiment of FIG. 4 corresponding to welded joint 201 at cross section A-A

| Position | Temperature (° C.) |
|---|---|
| A | 755 |
| B | 746 |
| C | 745 |
| D | 740 |
| E | 727 |
| F | 718 |

From the results of Tables 1 and 2, the temperatures measured at the positions are averaged as the temperature value. It can be seen that using the second thermal insulation section 12, the temperature at the welded joint 201 is reduced by 36° C. as compared to the prior art, i.e., using the first thermal insulation section 11, in which the temperature at the position B where the temperature is reduced the most is reduced by approximately 50° C., and the temperature distribution is more uniform, and a thermal stress reduction is also used to further prevent thermal fatigue. If the groove-shaped second thermal insulation section 12 shown in FIG. 3 is used, the temperature will be reduced even more, about 50° C. Therefore, with a structure in which the second housing 121 uses the second thermal insulation section 12 similar to that in FIGS. 3 and 4 and in which the second material layer 122 is an air layer, the temperature value may be reduced by 30-55° C.

It can be seen from the above that the beneficial effects of using the heat shield, the exhaust system and the automobile introduced in the embodiments described above include, but are not limited to:

1. the second thermal insulation section is used to protect the thermal-fatigue weak zone in the exhaust system shell and weaken the thermal insulation effect of the thermal-fatigue weak zone, such that the temperature of the thermal-fatigue weak zone is reduced to prolong the fatigue life of the thermal-fatigue weak zone, so as to prolong the fatigue life of the whole exhaust system shell, reduce the maintenance cost, and also ensure the reliable operation of the exhaust system; and the first thermal insulation section with good thermal insulation performance is used to cover most of the other zones of the exhaust system, i.e., the thermal-fatigue non-weak zone, for thermal insulation so as to maintain the temperature of the exhaust system and prolong the fatigue life of the exhaust system shell;

2. the configuration of the second thermal insulation section can also make the temperature distribution in the thermal-fatigue weak zone more uniform and reduce the thermal stress;

3. due to the prolonged fatigue life of the exhaust system shell, the maintenance costs of the exhaust system and the automobile can be reduced, and the operation reliability of the exhaust system and the automobile can be improved.

Although the present disclosure has been disclosed as the above embodiments which, however, are not intended to limit the present disclosure, any person skilled in the art could make possible changes and alterations without departing from the spirit and scope of the present disclosure. Hence, any alteration, equivalent change and modification which are made to the above-mentioned embodiments in accordance with the technical essence of the present disclosure without departing from the contents of the technical solutions of the present disclosure would all fall within the scope of protection defined by the claims of the present disclosure.

We claim:

1. An exhaust system, comprising:
an exhaust system shell; and
a heat shield, including a first thermal insulation section and a second thermal insulation section, wherein the second thermal insulation section is axially connected to the first thermal insulation section, and the thermal insulation performance of the second thermal insulation section is lower than that of the first thermal insulation section;
wherein the exhaust system shell comprises a thermal-fatigue weak zone and a non-weak zone in which the thermal-fatigue weak zone is one of a welded joint and a connection made of different materials forming the exhaust system shell, the first thermal insulation section of the heat shield covers the non-weak zone, and the second thermal insulation section of the heat shield covers the thermal-fatigue weak zone; and
wherein the heat shield comprises two first thermal insulation sections and the second thermal insulation section is located axially between the two first thermal insulation sections.

2. The exhaust system of claim 1, wherein the thermal-fatigue weak zone is a welded joint of the exhaust system shell.

3. The exhaust system of claim 1, wherein the thermal-fatigue weak zone includes a transitional edge between two non-weak zones.

4. The exhaust system of claim 1, wherein the first thermal insulation section comprises a thermal insulation material layer and a first housing, with an inner side of the thermal insulation material layer being configured to be in contact with the shell, and the first housing covering the thermal insulation material layer on an outer side of the thermal insulation material layer; the second thermal insulation section comprises a second housing and a second material layer, with the thermal insulation performance of the second material layer being lower than that of the thermal insulation material layer, and the second housing covering the second material layer on an outer side of the second material layer; and the second housing is axially connected to the first housing.

5. The exhaust system of claim 4, wherein the second housing is radially and inwardly recessed an inward recessing depth relative to the first housing.

6. The exhaust system of claim 4, wherein the thickness of the second material layer is the same as that of the thermal insulation material layer, and the radial dimensions of the second housing is the same as that of the first housing.

7. The exhaust system of claim 4, wherein the second material layer is an air layer, and the material of the thermal insulation material layer is a porous thermal insulation material.

8. The exhaust system of claim 7, wherein the temperatures of the second thermal insulation section is reduced by 30-55 degrees Celsius compared to that of the first thermal insulation section.

9. An automobile, comprising:
an internal combustion engine;
an exhaust system, including an exhaust system shell having a thermal-fatigue weak zone and a non-weak zone in which the thermal-fatigue weak zone is one of a welded joint and a connection made of different materials forming the exhaust system shell; and
a heat shield, the heat shield including a first thermal insulation section and a second thermal insulation section, wherein the second thermal insulation section is axially connected to the first thermal insulation section, and the thermal insulation performance of the second thermal insulation section is lower than that of the first thermal insulation section;
wherein the first thermal insulation section of the heat shield covers the non-weak zone, and the second thermal insulation section of the heat shield covers the thermal-fatigue weak zone; and
wherein the heat shield comprises two first thermal insulation sections and the second thermal insulation section is located axially between the two first thermal insulation sections.

10. The automobile of claim 9, wherein the internal combustion engine is a gasoline engine.

11. The automobile of claim 9, wherein the thermal-fatigue weak zone includes a transitional edge between two non-weak zones.

* * * * *